(12) United States Patent
Figueroa

(10) Patent No.: US 9,389,436 B2
(45) Date of Patent: Jul. 12, 2016

(54) 3D COVER GLASSES FOR APPLYING OVER PRESCRIPTION EYEGLASSES

(71) Applicant: Rebeca Figueroa, Largo, FL (US)

(72) Inventor: Rebeca Figueroa, Largo, FL (US)

(*) Notice: Subject to any disclaimer, the term of this patent is extended or adjusted under 35 U.S.C. 154(b) by 0 days.

(21) Appl. No.: 14/120,003

(22) Filed: Apr. 14, 2014

(65) Prior Publication Data

US 2015/0293367 A1   Oct. 15, 2015

(51) Int. Cl.
*G02B 27/22* (2006.01)
*G02C 9/04* (2006.01)
*G02B 27/26* (2006.01)

(52) U.S. Cl.
CPC .............. *G02C 9/04* (2013.01); *G02B 27/2207* (2013.01); *G02B 27/26* (2013.01)

(58) Field of Classification Search
CPC .......................................................... G02C 9/04
USPC ............................................. 359/464; 351/47
See application file for complete search history.

(56) References Cited

U.S. PATENT DOCUMENTS

| | | | | |
|---|---|---|---|---|
| 1,794,927 A * | 3/1931 | Smith | ................... | G02C 7/16 2/13 |
| 3,023,418 A * | 3/1962 | Hammond | ............... | G02C 7/10 2/13 |
| 3,171,134 A * | 3/1965 | Kennedy | ................. | G02C 7/10 2/13 |
| 3,901,589 A * | 8/1975 | Bienenfeld | ..................... | 351/47 |
| 5,302,977 A * | 4/1994 | Markovitz et al. | ............ | 351/114 |
| 5,493,348 A | 2/1996 | Herald, Jr. et al. | | |
| 6,474,810 B1 | 11/2002 | Ng | | |
| 7,048,374 B2 | 5/2006 | Ng | | |
| 8,348,161 B2 | 1/2013 | Huang | | |
| 2005/0052613 A1* | 3/2005 | Kidouchim | ..................... | 351/47 |
| 2006/0244898 A1* | 11/2006 | Lee | ............................... | 351/47 |
| 2011/0304462 A1 | 12/2011 | Yoo et al. | | |
| 2013/0114037 A1 | 5/2013 | Earley | | |

FOREIGN PATENT DOCUMENTS

| | | | | |
|---|---|---|---|---|
| CN | 202049298 | * | 4/2011 | .............. G02C 9/04 |
| CN | 202735596 | * | 5/2012 | .............. G02C 9/04 |
| CN | 203480130 | * | 9/2013 | .............. G02C 9/04 |
| EP | 0142957 A2 | | 5/1983 | |
| EP | 2403260 A2 | | 1/2012 | |
| WO | WO2012/064581 A2 | | 5/2012 | |
| WO | WO2012/089070 A1 | | 7/2012 | |

OTHER PUBLICATIONS

Printout of eBay web page dated Aug. 13, 2013.

* cited by examiner

*Primary Examiner* — Jordan Schwartz
*Assistant Examiner* — George G King
(74) *Attorney, Agent, or Firm* — Richard C. Emery

(57) ABSTRACT

The invention discloses a cover glass system for securing lenses to prescription eyeglasses to allow the viewer to watch a three dimensional motion picture or television program. Lenses having different characteristics are mounted in a frame having elastic loops are attached to the upper corners of the cover glass system to further secure the cover glass system to prescription eyeglasses.

3 Claims, 2 Drawing Sheets

3D COVER GLASSES FOR APPLYING OVER PRESCRIPTION EYEGLASSES

FIELD OF THE INVENTION

The invention relates to lenses used during the viewing of three dimensional motion pictures or television. The cover lenses are adapted to be able to attach to prescription eyewear.

BACKGROUND

Three dimensional motion pictures have existed since about 1915 in various forms. In all cases, special lenses must be worn to separate two separate, simultaneously projected images. One system utilizes a color separation system, relying on red and cyan color filters, one over each eye, to create the illusion of enhanced depth perception. Yet another system utilizes a polarization system wherein two images are projected onto the screen through different polarizing filters. The viewer wears a pair of polarized lenses that correspond with the two images, which also gives the illusion of enhanced depth perception. Additional systems have also been developed. Problems arise, however, when viewers who are users of prescription lenses wish to view a three dimension motion picture or television program must either wear contact lenses, which not all prescription lens wearers use, or are forced to place awkward extra lenses over their spectacles which may not be secured and will thus have a tendency to fall off during viewing. What is clearly needed, then, is a type of three dimensional lenses that can be securely attached and then detached from any standard eyeglass frame to allow eyeglass wearers to enjoy a three dimensional motion picture.

SUMMARY

In one embodiment the invention comprises a cover glass system to be placed over conventional prescription eyeglasses to allow the viewer to watch a three dimensional motion picture or television program. The cover glass system has a right lens and a left lens which are mounted in a frame. A downward facing slot is configured into the frame to partially secure the cover glass system. An elastic member is attached to the frame for further securing the cover glass system. In another embodiment the elastic member comprises a pair elastic loops located on the upper right and upper left corners of the frame. In yet another embodiment a gripper lines the downward facing slot to further secure the conventional prescription eyeglasses to the cover glasses.

DETAILED DESCRIPTION

The particulars shown herein are by way of example and for purposes of illustrative discussion of the invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

NOMENCLATURE

Figure 1A:
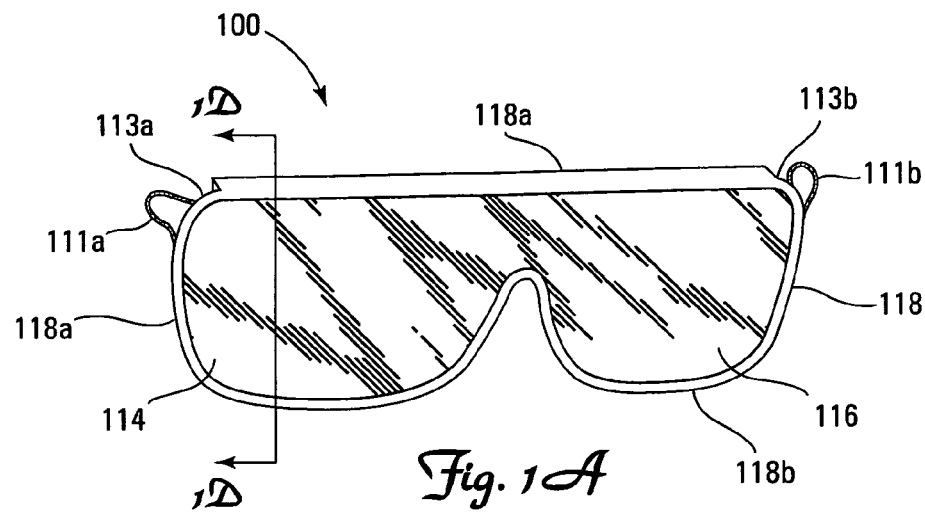
FIG. 1A is a perspective view of an embodiment of the invention.

50 Eyeglasses
52 Upper Edge of Eyeglasses
100 Cover Glasses
111a Loop (Right)
111b Loop (Left)
112 Gripper
113a Upper Right Corner of Frame
113b Upper Left Corner of Frame
114 Right Lens
116 Left Lens
118 Frame
118a Upper Frame
118b Lower Frame
120 Slot Construction FIG. 1A shows an embodiment of the cover glasses 100 of the present invention. In this embodiment, the cover glasses 100 are further secured to the conventional prescription eyeglasses by means of a pair of elastic loops 111a, 111b each attached at the corner to allow the temples of the conventional prescription eyeglasses 50 to be fitted there through. As best shown in FIG. 1A, the frame 118 comprises an upper frame 118a and a lower frame 118b, as well as an upper right corner 113a and an upper left corner 113b. FIG. 1D is a cross section taken through the lines 1D-1D and illustrates that a downward facing slot 120 is formed into the upper frame 118a and that a gripper 112 is further formed into the slot 120. The function of the gripper 112 is to further secure the attachment of conventional prescription eyeglasses 50 by resisting movement when the cover glasses 100 are attached. The gripper 112 can be made of a gel or other material having acceptable durometer characteristics (i.e., soft enough) that will grip the conventional prescription eyeglasses 50 as well as preventing their frame from being scratched. It is understood that the nature of three dimensional motion picture technology requires the presence of a right lens 114 and a left lens 116 having different qualities. Depending on the technology employed, one lens will be red and the other cyan, in others the lenses will be polarized in different dimensions to produce the illusion of enhanced depth of field, in still others; different technologies will be used. In some embodiments the right lens 114 and left lens 116 may be separate from each other; in other embodiments, the right lens 114 and left lens 116 may be integrated. The right lens 114 and left lens 116 are mounted in a polymeric frame 118 to allow placement of the cover glasses 100 over conventional prescription eyeglasses 50.

Figure 1B:
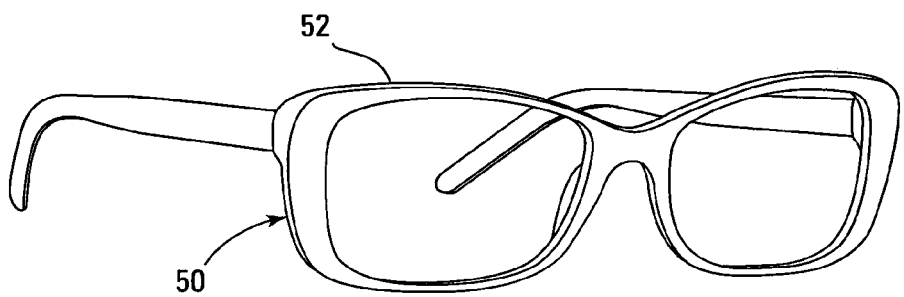
FIG. 1B is a perspective view of a conventional pair of eyeglasses.
Figure 1C:
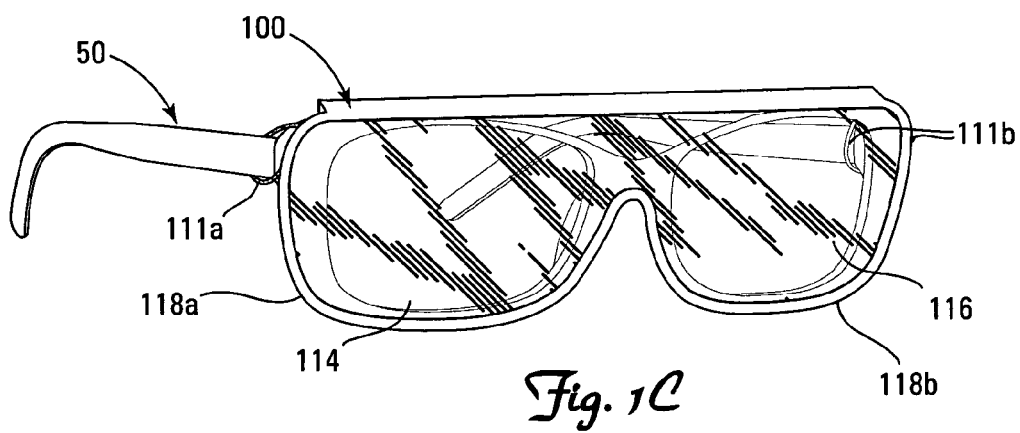
FIG. 1C is a perspective view of a conventional pair of eyeglasses fitted with the embodiment shown in FIG. 1A.
Figure 1D:
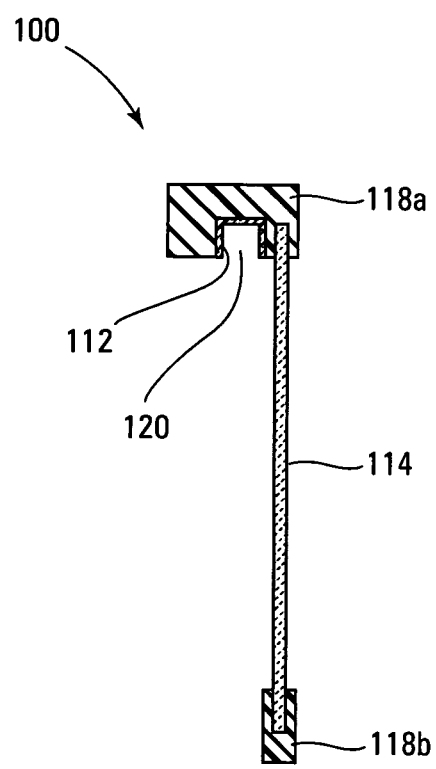
FIG. 1D is a cross section taken through the lines 1D-1D in the embodiment shown in FIG. 1A.

FIG. 1B shows a pair of conventional prescription eyeglasses 50. FIG. 1C shows the cover glasses 100 fitted to the conventional prescription eyeglasses 50.

The frame 118 can be made of polymeric, vinyl, rubber or any other material possessing suitable flexibility and durability characteristics. It should be mentioned that due to the many varieties in conventional prescription eyeglass size and style, it is envisioned that it may be necessary to manufacture several sizes and/or shapes of cover glasses 100.

Use

Securing the cover glasses 100 to a pair of conventional prescription eyeglasses 50 involves slipping either temple (unnumbered) of the conventional prescription eyeglasses 50 through its corresponding loop 111*a*, 111*b* followed by the other temple. The cover glasses 100 will then be secured to the conventional prescription eyeglasses 50 with the gripper 112 resting on the upper edge 52 of the conventional prescription eyeglasses 50 for the duration of the three dimensional movie or television program. Following completion of the movie or television program the cover glasses 100 are removed by sliding the right and left loops 111*a*, 111*b* off and lifting the cover glasses 100 off the conventional prescription eyeglasses. The cover glasses 100 can be either reused or recycled.

What is claimed is:

1. A cover glass system to be placed over prescription eyeglasses to allow the viewer to watch a three dimensional motion picture or television program, consisting of:
   (a) the cover glass system defining a frame with an upper frame portion, the upper frame portion further defining a downward facing side and further defining a width and a height;
   (b) a right lens and a left lens;
   (c) the right lens and left lens mounted in said frame;
   (d) the upper frame portion having a slot facing in the downward facing side and extending substantially the width of the cover glass system wherein the slot is lined with a gripper material to allow positioning of the cover glass system to partially secure the cover glass system to the prescription eyeglasses; and
   (e) a right elastic member and a left elastic member made of an elastic material each comprising a loop wherein the loop of the right elastic member and the loop of the left elastic member are attached to the right and left side of the frame, respectively.

2. The cover glass system of claim 1 further comprising the right loop and left loop being located on the cover glass system at approximately the right upper corner and left upper corner of the frame.

3. The cover glass system of claim 1 wherein the gripper material is made of a gel material.

\* \* \* \* \*